United States Patent
McCarthy

(10) Patent No.: US 10,807,221 B2
(45) Date of Patent: Oct. 20, 2020

(54) PACKING TOOL AND PROCESS

(71) Applicant: Lisa McCarthy, Virginia Beach, VA (US)

(72) Inventor: Lisa McCarthy, Virginia Beach, VA (US)

(*) Notice: Subject to any disclaimer, the term of this patent is extended or adjusted under 35 U.S.C. 154(b) by 136 days.

(21) Appl. No.: 15/914,186

(22) Filed: Mar. 7, 2018

(65) Prior Publication Data

US 2019/0277405 A1    Sep. 12, 2019

(51) Int. Cl.
  *B25B 27/00* (2006.01)
  *F16J 15/3268* (2016.01)

(52) U.S. Cl.
  CPC ....... *B25B 27/0028* (2013.01); *F16J 15/3268* (2013.01); *Y10T 29/53657* (2015.01)

(58) Field of Classification Search
  CPC ............ B25B 27/0028; Y10T 29/53657; F16J 15/3268
  USPC .................................................. 277/511, 551
  See application file for complete search history.

(56) References Cited

U.S. PATENT DOCUMENTS

| 1,956,843 A * | 5/1934 | Wheeler | B25B 27/0028 29/235 |
| 3,432,172 A * | 3/1969 | Hendrickson | F16J 15/184 277/308 |
| 3,604,096 A * | 9/1971 | Shiroma | B25B 27/0028 29/235 |
| 3,981,066 A * | 9/1976 | Calvert | B01D 33/00 29/451 |
| 4,218,813 A * | 8/1980 | Cather, Jr. | B25B 27/0028 277/551 |
| 4,610,834 A * | 9/1986 | Baron | B25B 27/0028 264/249 |
| 5,709,018 A * | 1/1998 | Dugan | B23P 19/084 29/235 |
| 5,956,830 A * | 9/1999 | Imbus | B23P 19/084 29/229 |
| 6,023,826 A * | 2/2000 | Harrelson, III | B25B 27/0028 29/213.1 |
| 6,349,459 B1 * | 2/2002 | Dean | B25B 27/0028 29/235 |

(Continued)

FOREIGN PATENT DOCUMENTS

CN        109099161 A   * 12/2018

OTHER PUBLICATIONS

CN 109099161-A Machine Translation from espace.net retreived Nov. 13, 2019.*

*Primary Examiner* — Nicholas L Foster
(74) *Attorney, Agent, or Firm* — Bradley D. Goldizen

(57) ABSTRACT

An improved packing tool and process includes a mobile packing gland having a first end with a large opening that accepts a ring of packing material. The packing gland tapers down from the first end to a second end which is arranged within a static gland that receives the packing material which comprises a seal. A ring of packing material is arranged within the mobile packing gland and is inserted into a static gland with a pusher. The pusher exerts uniform pressure about the ring of packing material to seat it within the static gland. Thereafter the pusher is withdrawn from the mobile packing gland and successive rings of packing material are stacked within the static gland by repeating the process.

4 Claims, 13 Drawing Sheets

(56) References Cited

U.S. PATENT DOCUMENTS

| | | | | |
|---|---|---|---|---|
| 8,807,572 B2* | 8/2014 | McCarthy | ............ | F16J 15/188 |
| | | | | 277/530 |
| 9,969,069 B2* | 5/2018 | Pergantis | ............ | B25B 27/023 |
| 2016/0312656 A1* | 10/2016 | Pergantis | ............ | B25B 27/023 |
| 2017/0320201 A1* | 11/2017 | Ohrmann | ............ | B23P 19/084 |
| 2018/0222026 A1* | 8/2018 | Pergantis | ............ | B25B 27/023 |
| 2019/0184532 A1* | 6/2019 | Petit | ............ | B25B 5/147 |
| 2019/0299378 A1* | 10/2019 | Horning | ............ | B25B 27/02 |

\* cited by examiner

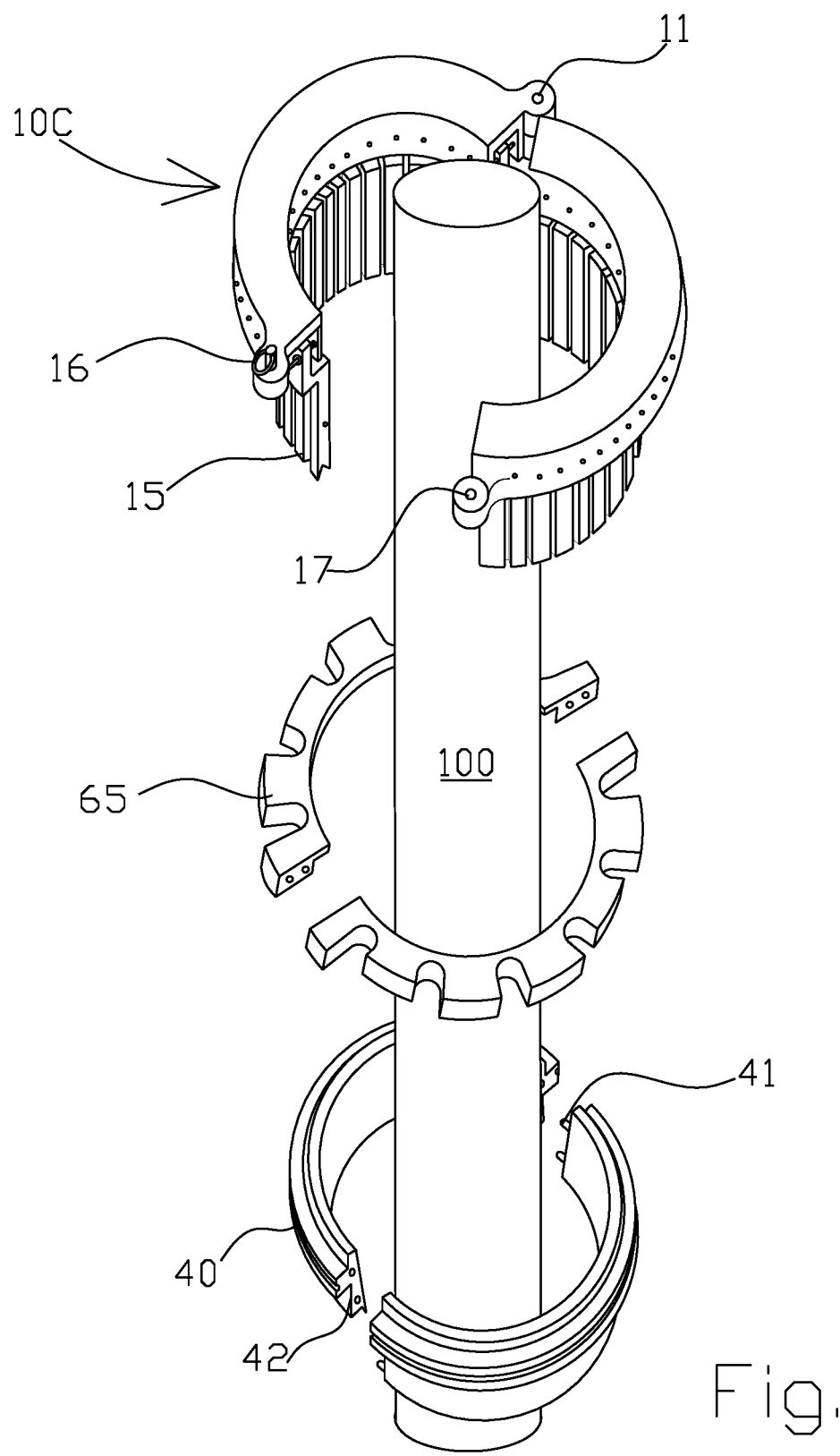

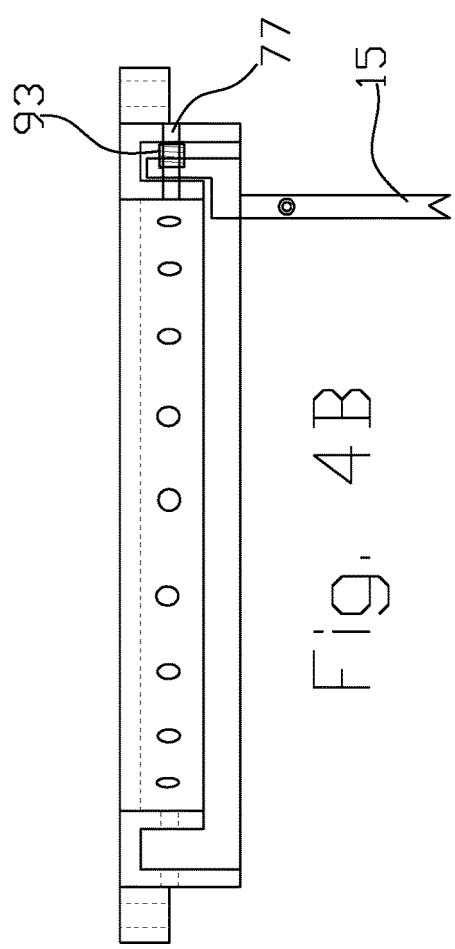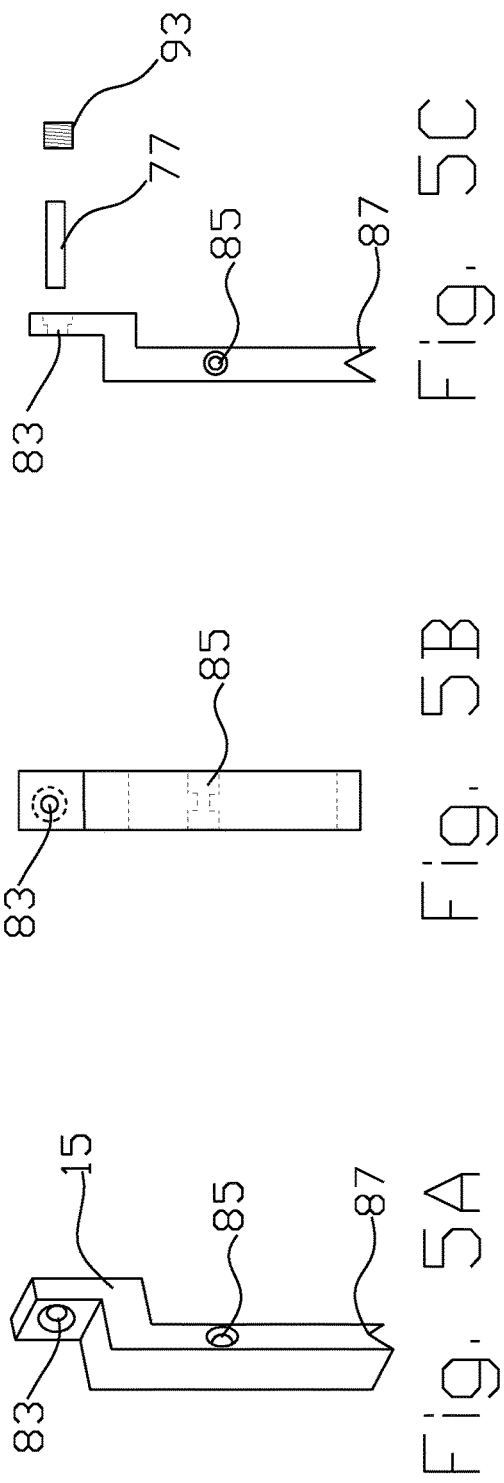

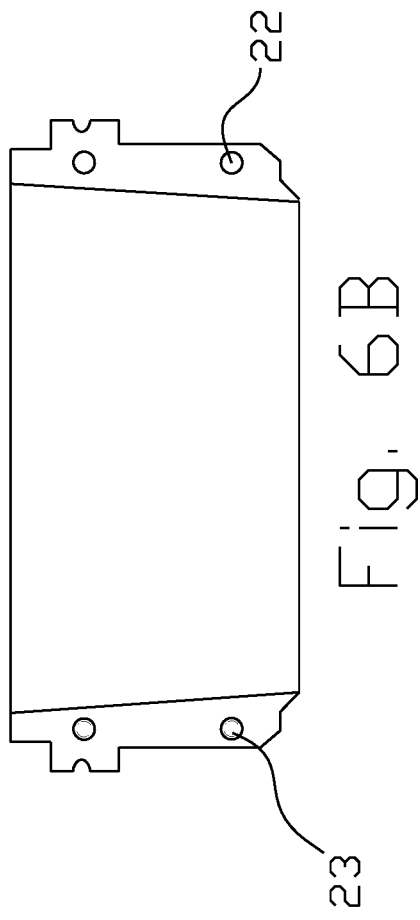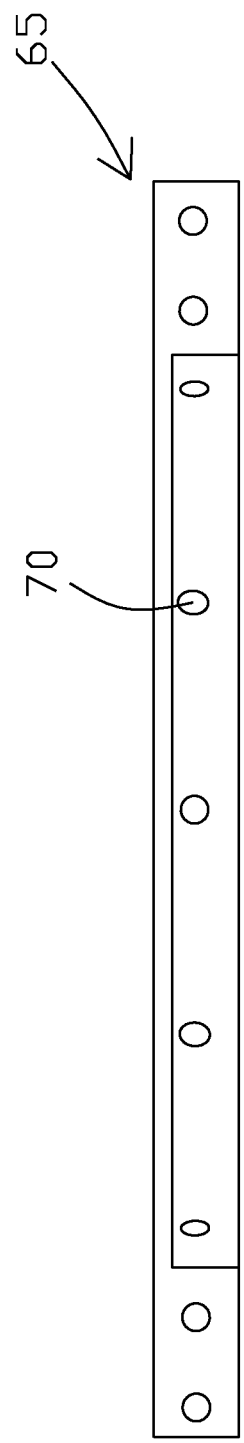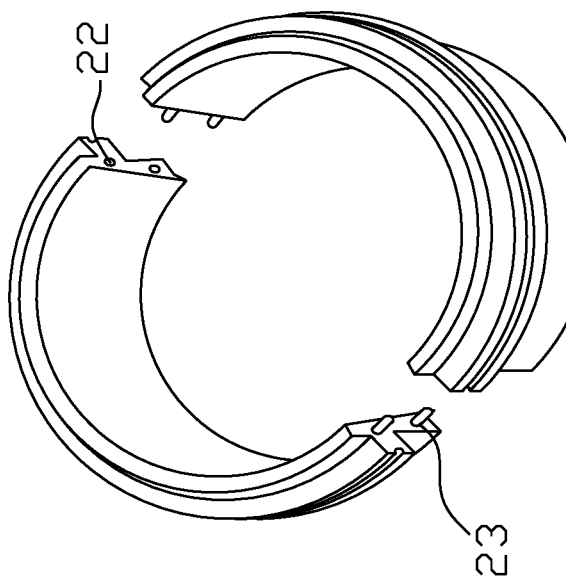

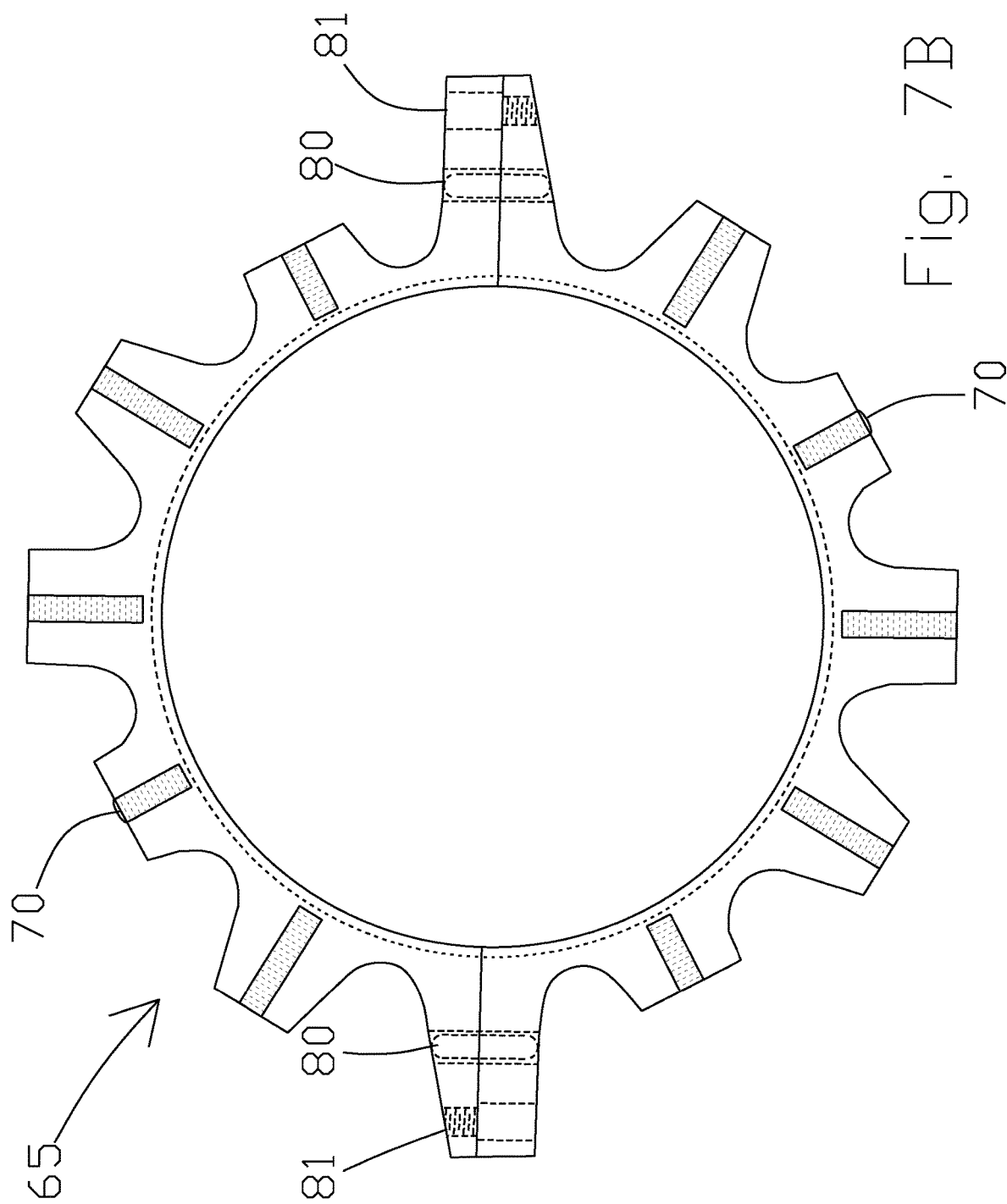

PACKING TOOL AND PROCESS

There are no related patent applications.

The present application was not subject to federal research and/or development funding.

TECHNICAL FIELD

Generally, the present invention relates to a packing tool for seating a split collar seal which encompasses a shaft that creates a liquid tight seal along a region of the shaft. A process is disclosed for creating a reliable seal. More specifically, the invention is a V-pack seal packing tool which includes at least a tapered gland and a pusher. The process relates to use of the tapered gland, which may be either a solid or separable one. The pusher may comprise a solid, separable, or adjustable type.

BACKGROUND OF THE INVENTION

Circular packing material has been utilized for creating liquid tight seals on shafts in a variety of situations. Such packing material is disclosed in U.S. Pat. No. 8,807,572 to McCarthy which is incorporated by reference hereto. As set forth in McCarthy, V-pack material (V-pack) is provided in rings having an interior opening that is slightly smaller than a cross-section diameter of a shaft onto which several V-packs are seated. To create a shaft seal, a plurality of V-packs is slid onto the shaft and stacked against one another such that the top of each successive V-pack is seated into a bottom concave region of the previous V-pack. When a shaft seal needs to be rebuilt without removing the shaft, the V-packs are arranged around the shaft within a gland.

Previously, the circular packing material of each V-pack was cut in a diagonal cut or in the superior cut shown in McCarthy, arranged about the shaft, and stuffed in the gland. Service personnel used elongated objects such as popsicle sticks to stuff the packing material into the gland. Because the elongated objects only contacted a small surface of the packing material at one time, the packing material tended to slide unevenly across the shaft's surface. This results in uneven packing of the material within the gland which leads to premature failure of the seal. As multiple rings of packing material are stacked against one another to create the seal, overlapping ends can cause pockets of air to be trapped between the layers. The expansion of air within the shaft can unseat a shaft seal over time with temperature and pressure changes. Moreover, if the free ends of the circular packing material do not seat properly about the shaft, then a liquid tight seal is not achieved and water or other fluids may migrate from one end of the shaft to the other.

SUMMARY OF THE INVENTION

An improved packing tool and process are provided with a flange gland having an internal taper that allows for a slight compression of the packing material while pushing it into the cylinder. The tool further comprises a solid pusher that fits around a shaft and pushes a piece of packing material into a cylinder gland through the flanged gland in a uniform manner. This resolves the problems associated with the issues of improperly stacking the packing material or V-packs within the cylinder gland. Three versions of the packing tool are disclosed: a non-split version, a split version, and an adjustable version. That is, all three embodiments include a tapered gland which is either solid and split. The adjustable version may be used on shafts having different diameters.

The non-split version includes a solid packing pusher, a cone guide and a removable tapered gland. This version is useful in an instance where a free end of a shaft is present that extends through the packing gland. A cone guide may be attached to an end of the shaft for guiding the tapered gland and packing material onto the shaft. The removable tapered gland has two ends: one with a larger diameter, and a second with a smaller diameter. The end with the smaller diameter is arranged against the open end of the packing gland. Next, a ring of packing material (V-pack) is slid across the cone guide and onto the shaft and arranged at the larger diameter end of the removable tapered gland. The solid packing pusher is then used to push the ring of packing material through the removable tapered gland and into the packing gland to be seated at the closed end thereof. Successive rings of packing material are then stacked to create a seal. Thereafter, the removable tapered gland is withdrawn and the cone guide is detached from the shaft. The distal end of the solid packing pusher includes a groove into which the V-pack is temporarily seated during the installation process.

In a second embodiment, the packing tool comprises a tapered gland that is a two-piece flange and a hinged packing pusher. This version is useful when creating a seal where a free end of a shaft is inaccessible. The two-piece flange is configured about the shaft and operates in the same fashion as the solid removable tapered gland with respect to the first embodiment set forth above. The two-piece flange includes a small diameter end and a large diameter end. The smaller diameter end is arranged within or against the packing gland. The larger diameter end receives the circular packing material which has been split to allow it to surround the shaft and be seated within the packing gland. Thereafter, the hinged packing pusher is closed about the shaft and used to push the packing material through the two-piece flange and into the packing gland to be seated therein. The distal end of the hinged packing pusher includes a groove as in the solid packing pusher of the first embodiment and operates in the same manner to create a solid seal. Additional packing material rings are seated within the packing gland by repeating the process.

In a third embodiment, the invention is an adjustable packing pusher which comprises a self-adjusting packing pusher, a split master plate, and an adapter plate. The self-adjusting packing pusher is split and includes a hinge on one side to allow it to be arranged about a shaft. A locking pin is arranged on the opposite side for securing the packing pusher about the shaft. Fingers are arranged about the housing of the packing pusher. Each finger is spring loaded to allow the packing pusher to be used about a variety different of shaft sizes. Each finger further comprises a cutout region, preferably of 45 degrees, which operates as the grooves of the pushing packers in the previous two embodiments. The split master plate locks together about the shaft. A particular sized adapter plate snaps together as an assembly over the shaft and is joined with the master plate to form a single unit which operates as the tapered gland in the first two embodiments. Thereafter, cut rings of packing material (V-packs) are inserted into the packing gland as in the manner mentioned above with respect to the first two embodiments.

It is an object of the invention to provide an improved packing tool and process for creating a superior shaft seal that does not suffer from the inconsistent methods of installation currently used in the art.

It is another object of the invention to provide an improved packing tool that may be used in a variety of applications including those where an end of a shaft about which the seal is created is not free.

It is a further object of the invention to provide an improved packing tool that may be used to create a shaft seal on a variety of shafts having different diameters. Said packing tool comprising an adjustable packing tool to accommodate the shafts having different diameters.

Additional objects and advantages of the invention will be set forth in part in the description which follows, and in part will be obvious from the description, or may be learned from practicing the invention. The objects and advantages of the invention will be obtained by means of instrumentalities in combinations particularly pointed out in the appended claims.

BRIEF DESCRIPTION OF THE DRAWINGS

FIG. 3A is a perspective exploded view of a third embodiment of the invention and showing an adjustable hinged packing pusher, a split taper flange, and a split adapter plate arranged about a shaft.

FIG. 4B is a sectional plan view of the adjustable packing pusher taken from a side and showing one of the fingers.

FIG. 5A is an enlarged perspective view of a finger of the self-adjusting packing pusher. FIG. 5B is a plan view of the finger and showing the various features in phantom. FIG. 5C is a side view of the finger and associated parts.

FIG. 6A is a perspective view of an adapter plate for use in the self-adjusting packing pusher assembly. FIG. 6B is a plan view of the adapter plate shown in FIG. 6A.

FIG. 7A is an inside plan view of one-half of the split master flange. FIG. 7B is a plan view taken from an end of the split master flange.

DETAILED DESCRIPTION OF THE INVENTION

Figure 1A:
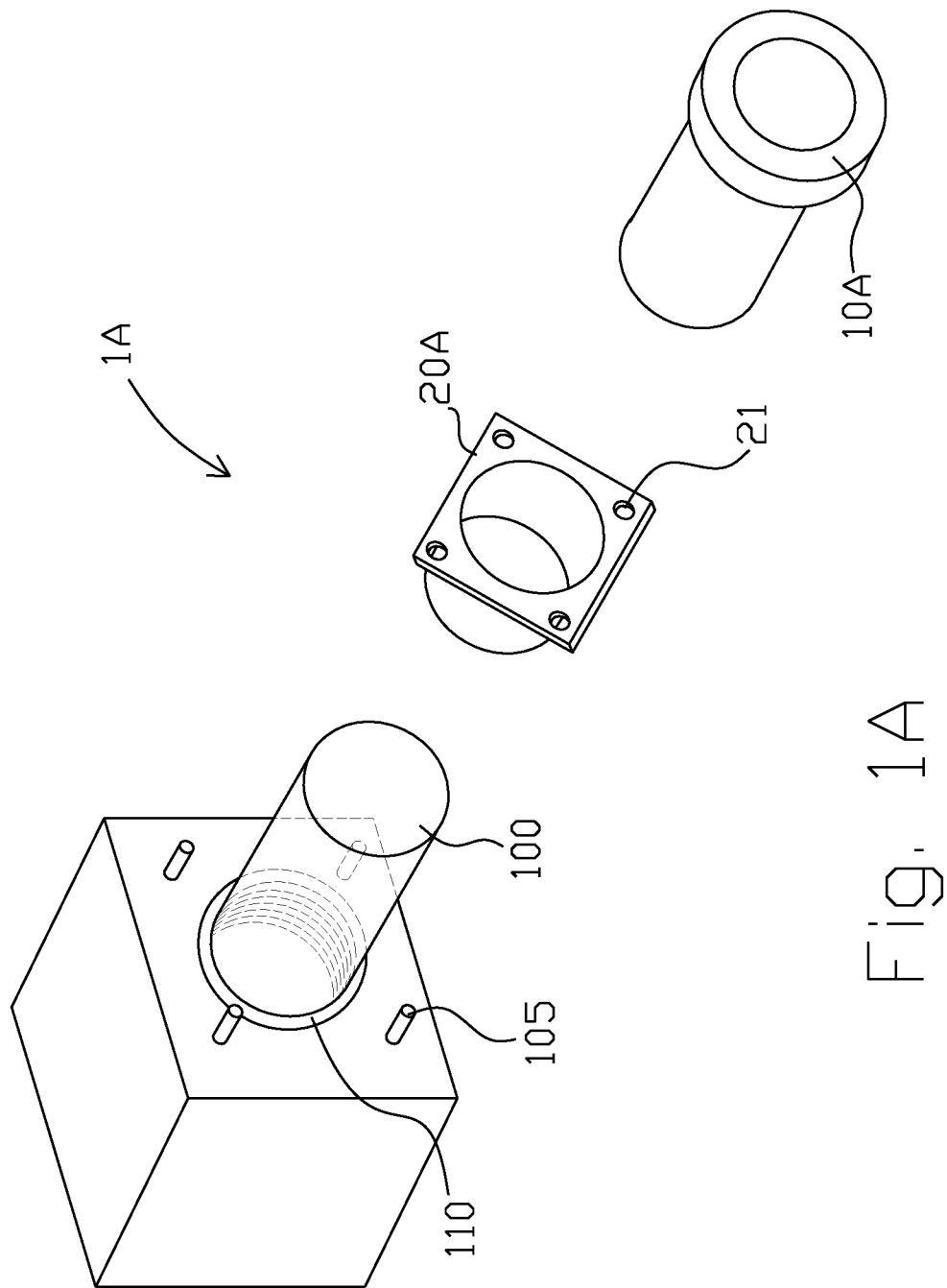
FIG. 1A is an exploded perspective view of a first embodiment of the invention and showing a shaft to be packed.

The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings. Broken lines shown in the drawings are representative of phantom views of the interior of the various elements.

FIG. 1A is an exploded view of a first embodiment of the invention 1A for use in an instance where a free end of a shaft is easily accessible. This assembly 1A comprises a tapered gland 20A with a packing pusher 10A. Both of these are slipped over the free end of the shaft. The terms "proximal" and "distal" are orientated such that the invention is in front of the user with the proximal end being near the user and the distal end being closer to the gland that is being packed to create a seal. The pushing packer 10A includes a proximal end formed generally in the shape of a toroid and having a distal end formed in the shape of cylinder attached thereto. The distal end of the pushing packer 10A preferably includes a groove, represented in FIG. 1B as an inverted V. The groove contacts the V-packs to seat them about the shaft 100 when creating a seal. The proximal toroidal end of the pushing packer 10A is gripped by the user and used to push the V-packs into place to create a seal. The inner diameter of the opening in both ends is slightly larger than the outer diameter of the shaft 100 about which a seal is to be formed. Gland 110 represents an opening into which packing material 120 (shown in FIG. 1B) is seated. Threaded studs 105 are provided for accepting an end plate (not shown) which secures the packing material 120 into place after a seal has been created.

Tapered packing gland 20A includes a proximal end formed generally in a square shape and having a plurality of openings 21 which receive the threaded studs 105 to hold the tapered packing gland 20A in place during the packing process. The distal end of the tapered packing gland 20A is toroidal and having an outer diameter that is smaller than the inner diameter of the gland 110, such that it may be seated within the gland 110 during the packing process, as more clearly shown in FIG. 1C. The inner diameter of tapered packing gland 20A tapers from a first diameter at the proximal end to a smaller second diameter at the distal end. The first diameter is larger than the outside diameter of the packing member 120 to easily accept it.

Figure 1C:
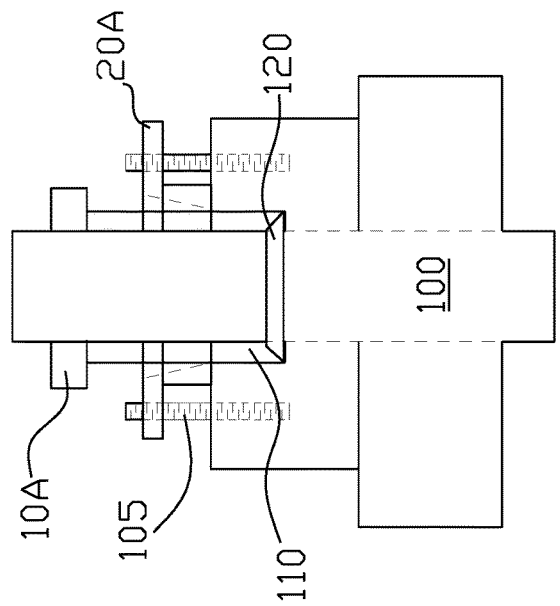
FIG. 1C shows the side view with the pusher and a seated packing ring.
Figure 1B:
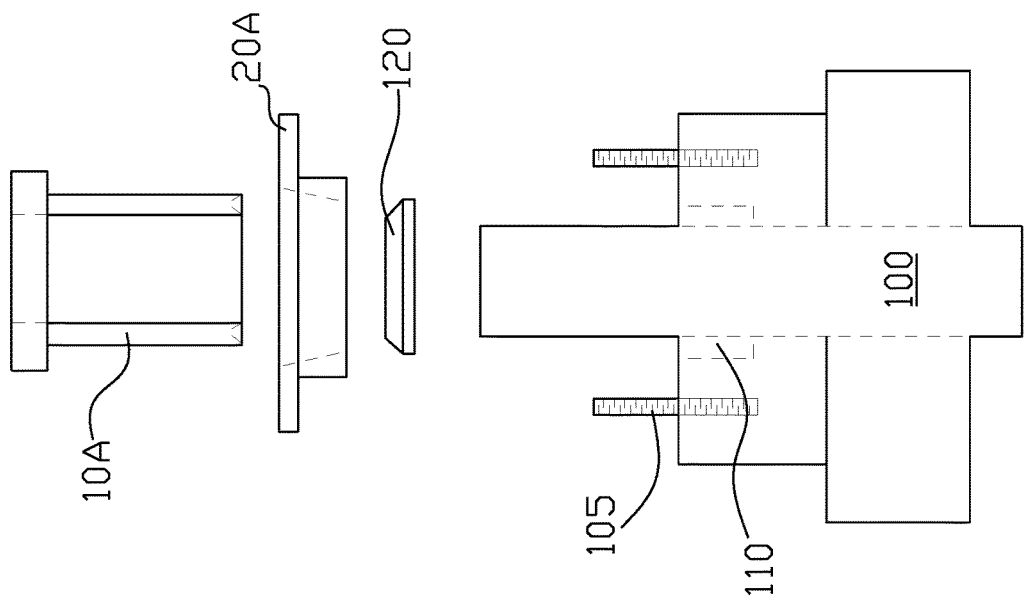
FIG. 1B shows an exploded side view of the first embodiment and the shaft to be packed.

As can be understood by FIGS. 1B and 1C, the distal end of tapered packing gland 20A is inserted into the gland 110 such that threaded studs 105 extend through openings 21. Next, a packing member 120 is arranged within the proximal end of the tapered gland 20A and about the shaft 100. The proximal end of the packing pusher 10A is gripped by the user and the packing pusher 10A is slid onto the free end of the shaft such that the distal end pushes against the packing member 120. The packing member 120 is then slid through the tapered interior of the tapered packing gland 20A until it is fully seated in gland 110, as shown in FIG. 1C.

Figure 1D:
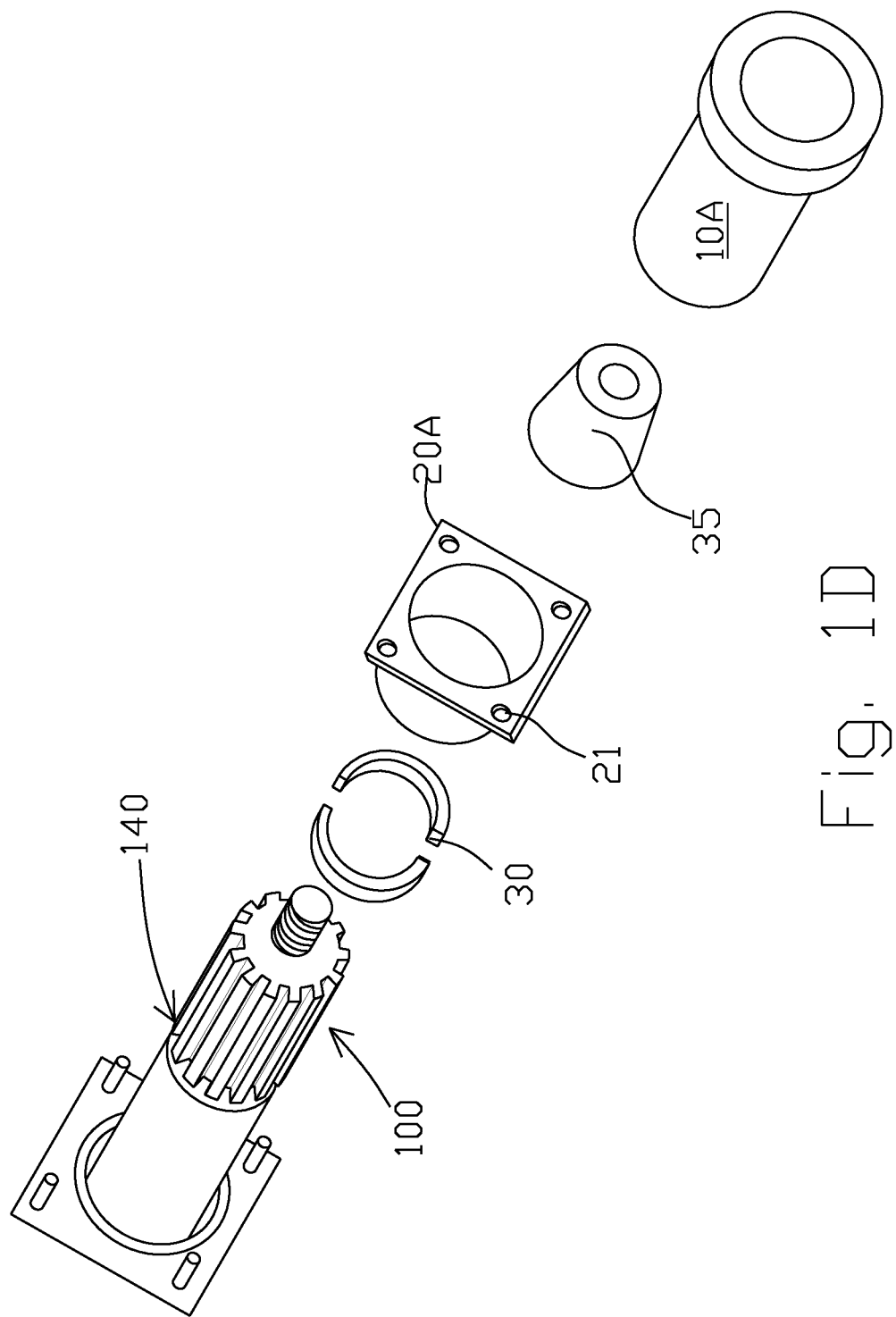
FIG. 1D shows an exploded view of the first embodiment for use on splined shaft having a keyway cutout.
Figure 1E:
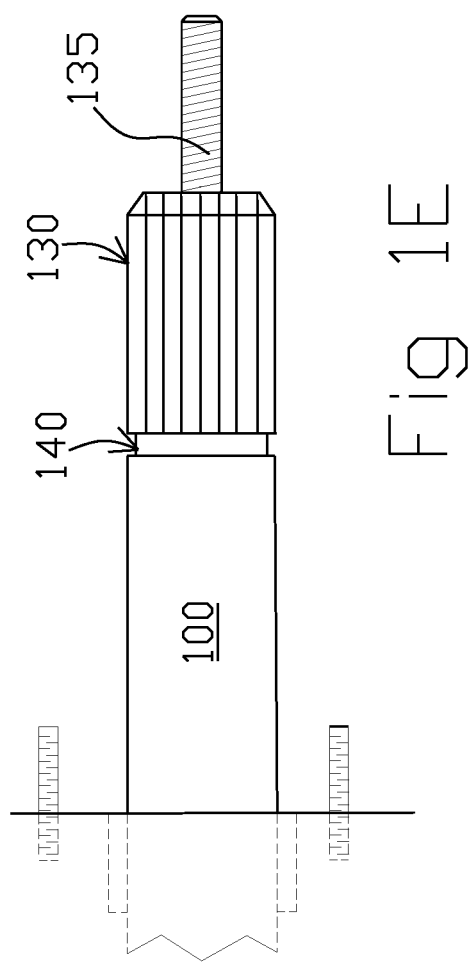
FIG. 1E shows an elevated side view of the shaft shown in FIG. 1D.
Figure 1F:
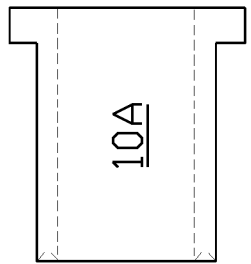
FIG. 1F shows the cone guide fastened onto the shaft with a key spacer ring arranged within the open keyway.
Figure 1F:
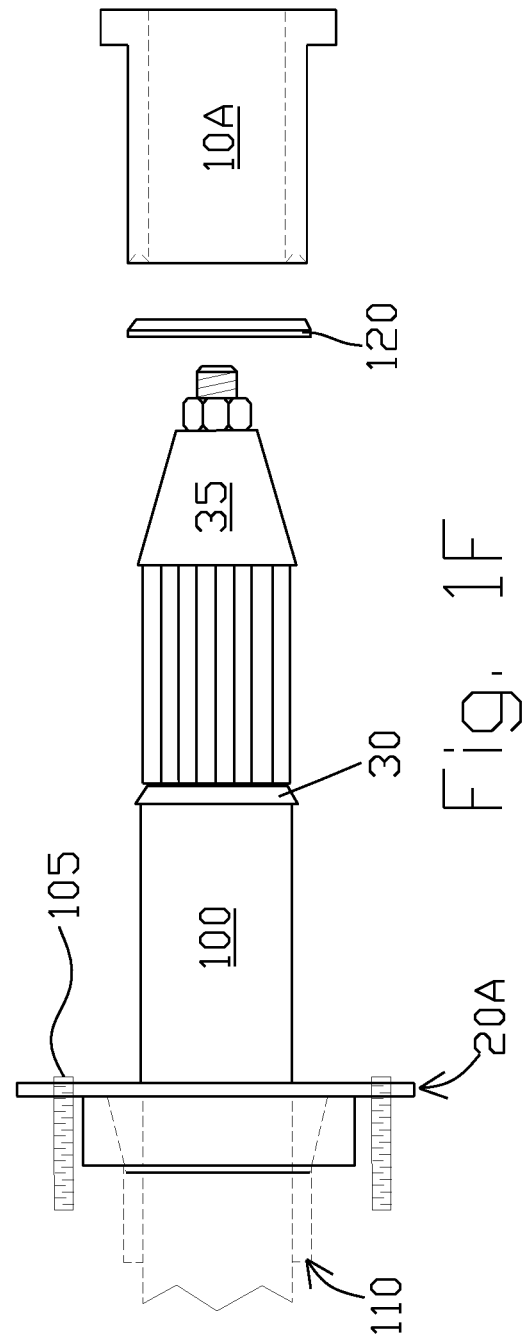

FIGS. 1D-1E show an embodiment of the assembly 1A where the proximal end of shaft 100 includes splines 130 and a threaded center 135. FIG. 1E shows a side view of the shaft 100 about which a seal is formed. A keyway cutout 140 is provided on the shaft 100 at the distal end of the splines 130 for accepting a key (not shown). In this instance, a two-piece keyway spacer ring 30 is assembled about the shaft 100 within the keyway cutout 140, as shown in FIG. 1F, to ensure that packing member 120 does not drop into and get caught within the keyway cutout 140 during the seal creating process. The keyway spacer ring 30 includes a tapered exterior which is smaller on the proximal end and larger on the distal end to assist in the seal creating process. Preferably, the outer diameter of the proximal end is substantially equal to the exterior diameter of the distal end of the splined portion of the shaft; while the outer diameter of the distal end of the keyway spacer 30 is substantially equal to or slightly larger than that of the shaft at the distal end of the keyway cutout 140. In this manner, a packing member 120 slides easily across the keyway spacer ring 30. That is, the keyway spacer ring 30 is generally shaped in the same shape as the key, except that that keyway spacer ring 30 has a sloped exterior. The cone guide 35 has a conical shape with a sloped exterior and having a larger exterior diameter on the distal end that the proximal end. An opening for accepting a threaded end of shaft 100 extends from the proximal to the distal end. The cone guide 35 is fastened to the threaded end 135 via a nut, as shown in FIG. 1F, to easily slide the packing member 120 across the splines 130. The key spacer ring 30 and cone guide 35 are preferably formed by a durable material such as metal, composite, or rubber.

Figure 2A:
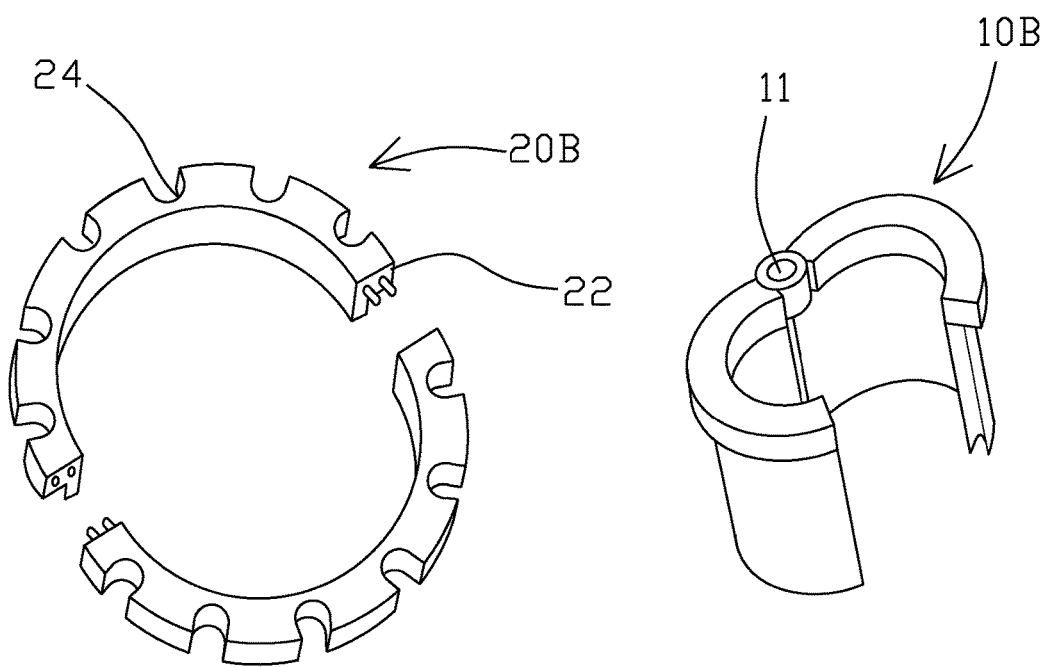
FIG. 2A is an exploded view of the second embodiment of the invention having a hinged pusher and for use on a shaft without a free end.
Figure 2B:
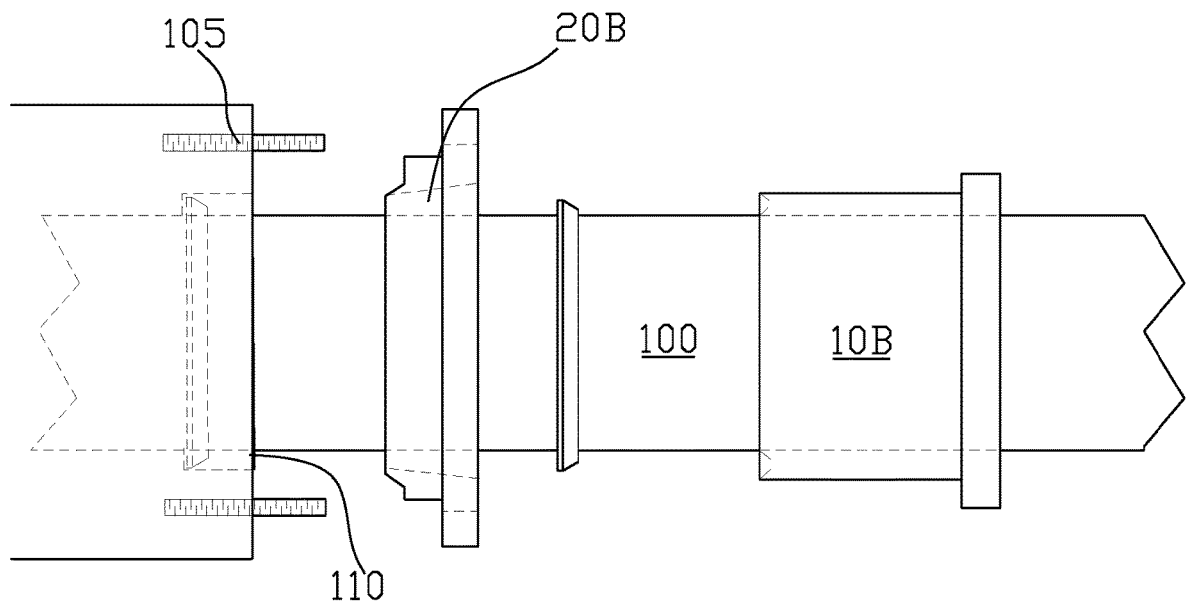
FIG. 2B shows the second embodiment arranged on the shaft to be sealed.

FIG. 2A is an exploded view of the second embodiment of the invention showing a split tapered gland 20B and a hinged packing pusher 10B. As shown in FIGS. 2A-2B, the split tapered gland 20B and the hinged packing pusher 10B are configured about shaft 100, as shaft 100 does not have a free end. Thus, the split tapered gland 20B and hinged packing pusher 10B are configured about shaft 100 as shown in FIG. 2B. A distal end of the tapered gland 20B, is slid into the packing gland 110. Packing member 120 is sliced such that it may be configured about the shaft 100. Thereafter, packing member 120 is pushed through split tapered gland 20B and into the packing gland 110. Successive packing members 120 are stacked into the packing gland 110 to create a seal. As can be recognized when viewing FIG. 2A, hinged packing pusher 10B is cut into two pieces and having one of the cut edges coupled together with a hinge 11. Split tapered gland 20B comprises external undulations 24. Dowels 22 are inserted into complementary openings 23 on an end of the opposite half as shown in FIG. 2A to hold the split tapered gland 20B together. The undulations 24 accept the threaded studs 105 that extend from the housing through which the shaft 100 passes. The hinged packing pusher 10B also includes a groove on the distal end for properly seating the packing members 120.

FIG. 3A is a perspective exploded view of a third embodiment of the invention and showing an adjustable hinged packing pusher 10C, a master plate 25 and a split adapter plate 40. The master plate 25 and split adapter plate 40 serve essentially the same purpose as the tapered glands 20A, 20B of the first and second embodiments mentioned above. That is, the assembled master plate 25 and split adapter plate 40 guide the packing member 120 into a gland 110 to be packed. In this embodiment, the adjustable hinged packing pusher 10C comprises hinge 11 which allows it to be fitted over a shaft and locked together via a locking pin 16 which slips into a pair of offset mating holes 17. Pin 16 is shown as being inserted into one of the offset mating holes 17. Each side of the open end of the adjustable hinged packing pusher 10C includes an offset opening, one arranged at a higher elevation than the other such that they overlap one above the other when the adjustable hinged packing pusher 10C is closed. Thereafter, the locking pin 16 is arranged in both openings to securely close the adjustable hinged packing pusher 10C about the shaft, as more clearly shown in FIGS. 3C-3J. This embodiment is designed to fit onto different sized shafts and automatically adjusts to the different diameters of the shafts. This embodiment allows packing members 120 to be stacked within a gland 110 to create a seal as previously disclosed.

Figure 3B:
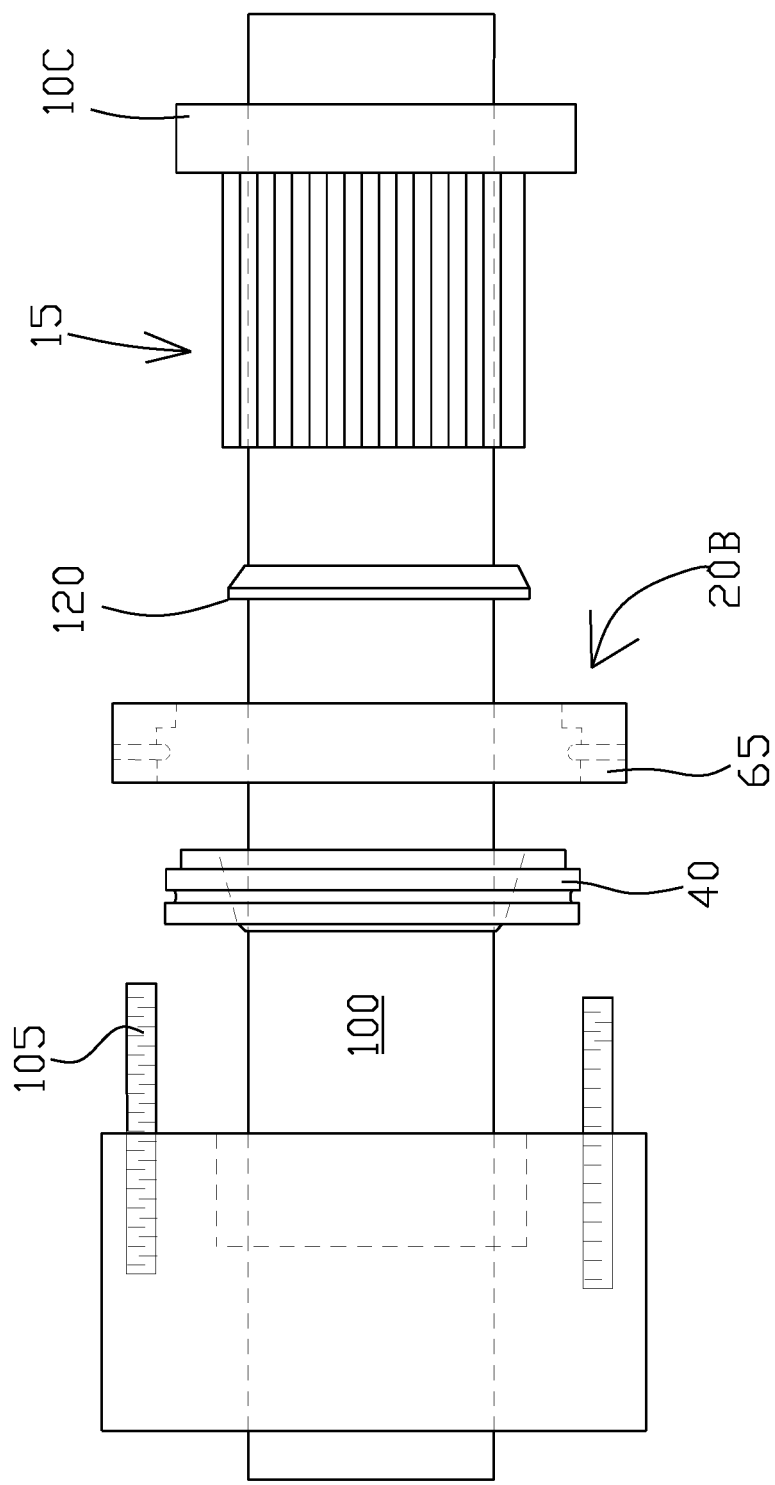
FIG. 3B is an elevated side view of a self-adjusting packing pusher assembly shown in FIG. 3A.

Master plate 65 locks together over the shaft 100. Adapter plates 40 are provided in a variety of sizes having different internal diameters for accommodating a plurality of glands. The adapter plates 40 include a pair of dowels 41 and complementary openings 42 for receiving them. The master plate 65 joins to the assembled adapter plates 40 on the shaft to form a single piece which acts as the tapered gland in the first two embodiment to aid in the insertion of the packing material 120 into the packing gland 110. Adapter plates 40 include an exterior groove which receives ball plungers 70 to hold the adapter plates 40 in the master plate. In FIGS. 3A, 3B, the adapter plates are referenced simply generically as element 40. However, in FIGS. 3C-3F, the adapter plate is a long adapter plate, referenced as element 40A and used for packing an inner gland. In FIGS. 3G-3J, a shorter adapter plate 40B is provided for packing an outer gland.

FIG. 3B is an elevated side view of a self-adjusting packing pusher assembly shown in FIG. 3A and showing the various parts of the overall assembly in phantom. As can be understood from the arrows, a proximal end of the adapter plate 40 seats within the distal end of the split master plate 65 and maintained therein by a plurality of ball plungers 70 arranged within openings in the master plate 65 as more clearly shown in 6B. A plurality of fingers 15 are arranged about the adjustable packing pusher 10C.

Figure 3C:
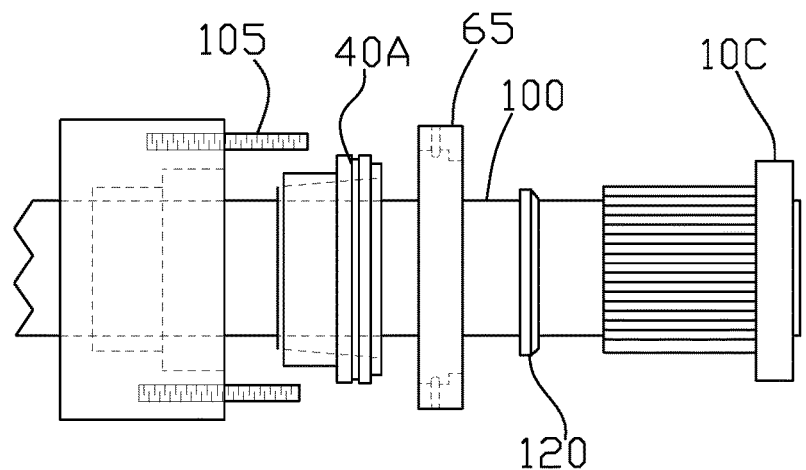
FIGS. 3C-3F show the third embodiment being utilized to pack an inner gland.
Figure 3D:
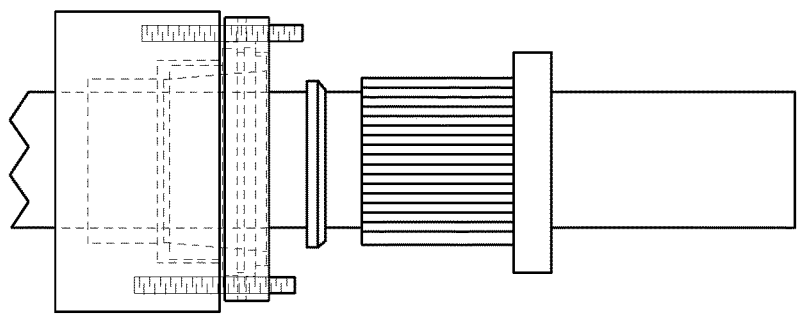
Figure 3E:
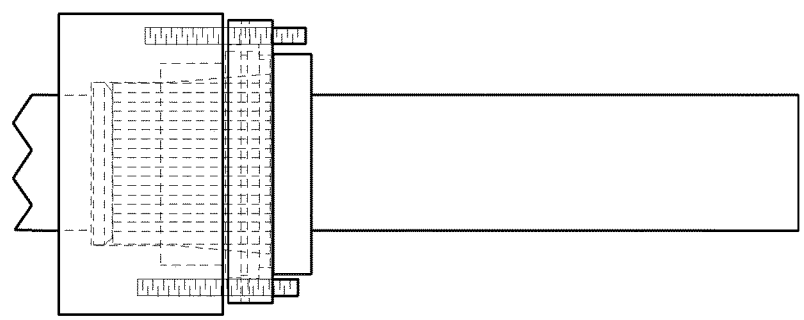
Figure 3F:
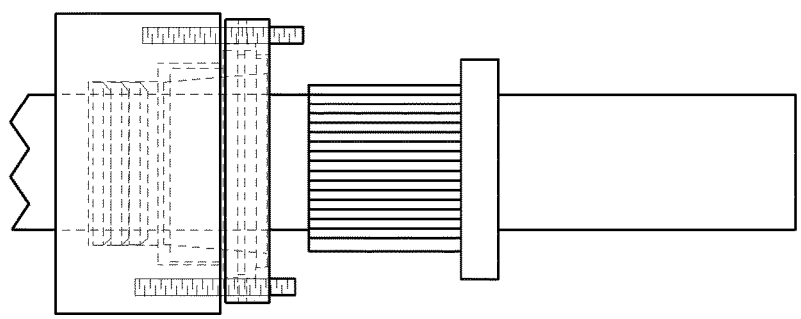

FIGS. 3C-3F show the third embodiment being utilized to create a pair of seals in an instance where an inner and outer gland is provided along the shaft 100. In this instance, a first adapter plate 40A is assembled around the shaft 100 along with the master plate 65. A packing ring is cut and configured about the shaft, as shown in FIG. 3C. The proximal end of the adapter plate 40A is inserted into the distal end of the master plate 65. The distal end of adapter plate 40A is arranged within the outer gland, as shown in FIG. 3D. Next, the packing member 120 is forced into the inner gland via the adjustable packing pusher 10C, as shown in FIG. 3E. The process is then repeated with a plurality of packing members 120 to create a seal within the inner gland.

Figure 3G:
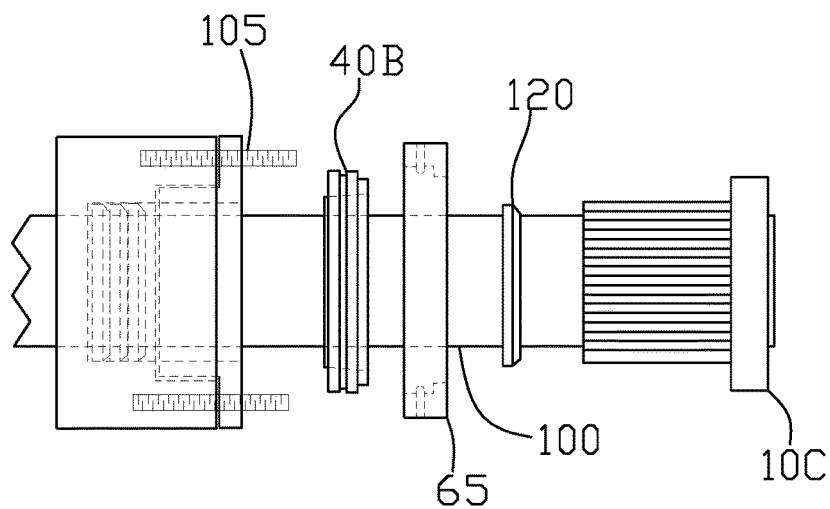
FIGS. 3G-3J show the third embodiment being utilized to pack an outer gland.
Figure 3H:
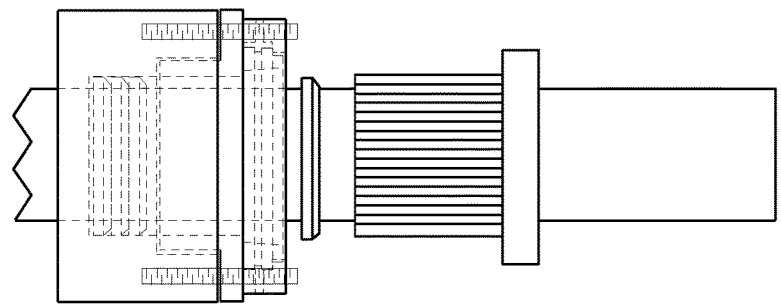
Figure 3I:
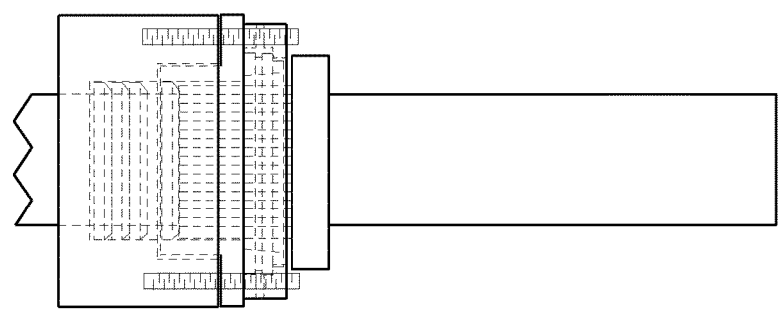
Figure 3J:
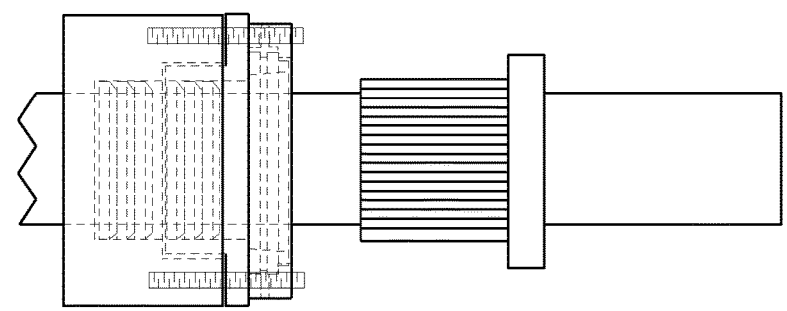

FIGS. 3G-3J show the third embodiment being utilized to pack an outer gland. After removing the adapter plate 40A, and installing a gland guard which holds the inner seal seated within the inner gland, a second adapter plate 40B is configured about shaft 100 as shown in FIG. 3G. The second adapter plate 40B is mated with the master plate 65 as mentioned above and inserted into the outer gland as shown in FIG. 3H. An outer seal is created in the outer gland by successively pushing packing members 120 into the outer gland as shown in FIGS. 3I and 3J.

Figure 4A:
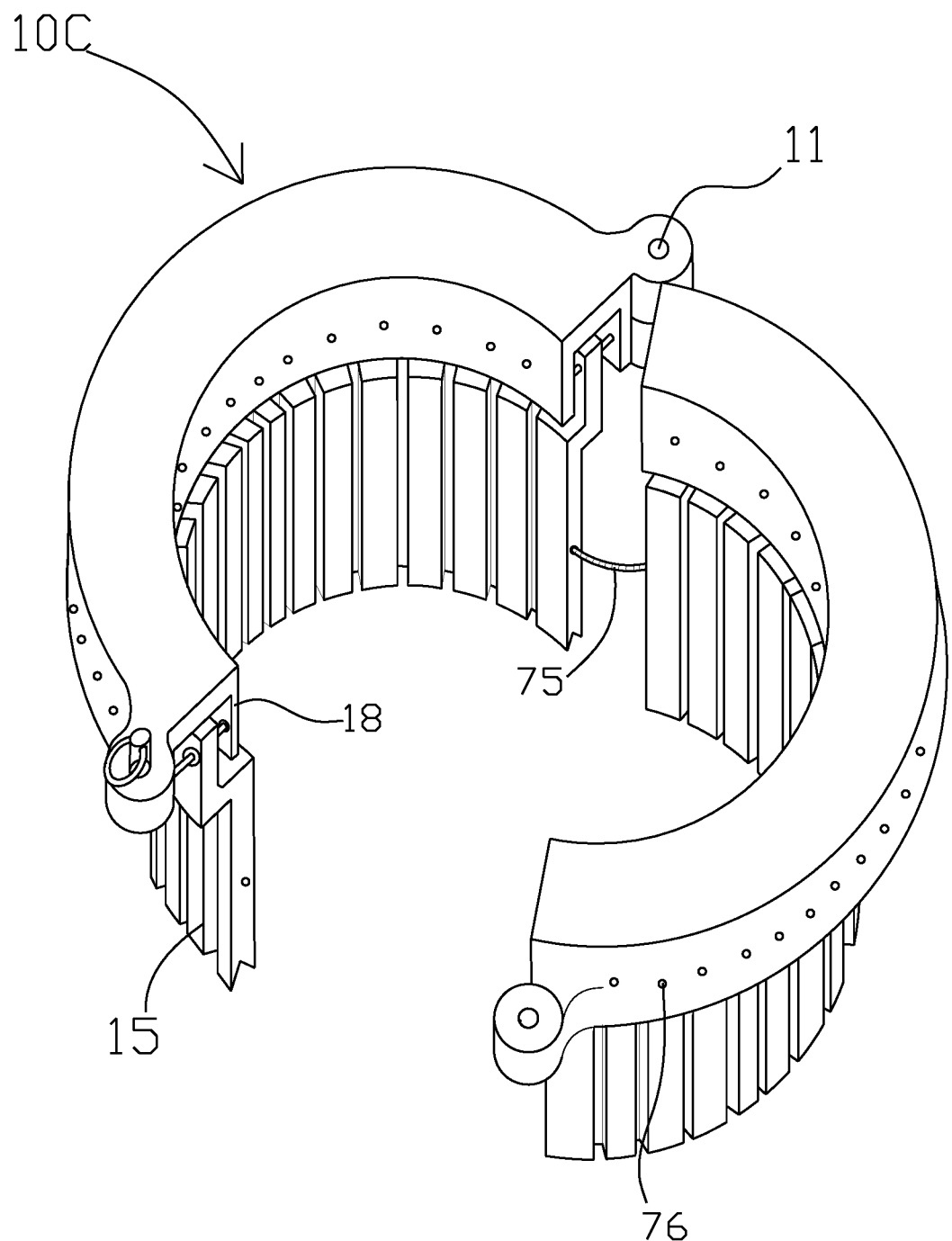
FIG. 4A is an enlarged view showing the adjustable packing pusher.

FIG. 4A is an enlarged view showing the adjustable packing pusher 10C. In the preferred embodiment, the adjustable packing pusher 10C has twenty-two independent fingers 15. Each finger 15 is spring-loaded via a garter style spring 75. The adjustable packing pusher 10C comprises a track 18 including a plurality of pin openings 76 into which one end of each finger 15 is secured via roll pin 77. FIG. 4B is a plan view of the adjustable packing pusher taken from a side and showing a one-inch open expansion area that allows each of the pusher fingers 15 to move equally to fit around a lager diameter shaft. Thus, the adjustable packing pusher 10C can accommodate shafts of varying diameters within in one-inch of one another. It should be recognized by the skilled artisan that by increasing the open expansion area of the track 18, then a larger range of diameters may be accommodated. A long garter spring 75 is fed through openings 85 in the sides of each finger to allow each to spring back to the smaller size shaft while allowing a tight spring fit onto a larger diameter shaft. Roll pin 77 passes through spring 93 and is seated as shown in FIG. 4B on each finger. The spring 93 assists in biasing the top of each finger as shown.

FIGS. 5A-5C are various views of a single finger 15. Each finger 15 includes an upper region which is seated within track 18. A roll pin opening 83 accepts a roll pin 77 which couples the finger 15 to the adjustable packing pusher 10C. The roll pin opening 83 is perpendicular to the garter spring hole 85. Each finger includes an upper region and a lower region separated by a middle region comprising a step as shown in FIG. 5C. The lower end of the lower region preferably terminates in a V-notch 87 for receiving the packing material 120. FIG. 5C shows roll pin 77 and spring 77 in an exploded fashion.

FIG. 6A is a perspective view of an adapter plate 40 for use in the self-adjusting packing pusher assembly. It should be noted that the term adapter plate is referred to in the disclosure as element 40 in the disclosure when generically referring to it. In specific instances, where different sized adapter plates are used for packing the inner and outer glands, each adapter plate is referred to as either element 40A or 40B to denote a difference in sizes. Each adapter plate 40 comprises a pair of dowels 23 and complementary openings 22 arranged on each sliced face as shown. These couple the two pieces of the adapter plate 40 together when in use. As can be recognized by viewing FIG. 6B, the proximal end of the adapter plate 40 fits into the distal end of the master flange 65. The interior diameter of the proximal end of the adapter plate 40 is larger than that of the distal end FIGS. 7A-7B are views of the split master flange. As can be recognized, the split master flange 65 includes twelve extensions of three different lengths. Ball plungers 70 are included in two to ten of the extensions. For purposes of reference, the longest two extensions are referenced as extensions one and seven, one being on the right in FIG. 7B, while seven is on the left. The longest two extensions are substantially five and seven sixteenths inches (5⁷⁄₁₆") in length. The split master flange 65 is split along these longest two extensions as shown. Moving around the master flange in a clockwise manner from the first extension, mid-length extensions are arranged at positions two, eight, ten and eleven. The mid-length extensions are substantially four and eleven sixteenths (4¹¹⁄₁₆") in length. Small-length extensions are arranged at positions three, six, nine and twelve. The small-length extensions extend four and one quarter inches (4¼"). The split master flange extensions or splines are arranged in this manner to allow it to fit over various sized packing gland bolting diameters. The center of each extension is arranged at 15 degrees from one another. In the preferred embodiment, ball plungers 70 are arranged within each of the extensions except the first and seventh ones which are the ones dissected by the split. Each of the longest extensions include a pair of openings extending perpendicular to their lengths. A dowel 80 is arranged in the inner most openings, while bolts 81 for holding the master plate 65 together are arranged within the outer most openings. The width of extensions three, four, five, six, nine, and twelve are substantially one and one-sixteenth to one and one-eighth inches (1¹⁄₁₆"-1⅛") wide. The width of extensions two, eight, ten, and eleven is substantially seven-eighths of an inch (⅞") wide.

It is to be understood that the invention is not limited to the exact construction illustrated and described above, but that various changes and modifications may be made without departing from the spirit and the scope of the invention as defined in the following claims. While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

I claim:

1. A packing assembly for creating a shaft seal about a shaft, said packing assembly comprising:
    a packing pusher comprising a proximal end formed in the shape of a toroid and a distal end formed in the shape of cylinder such that the proximal end is gripped by a user during use; and,
    a tapered packing gland having openings which receive threaded studs to secure the tapered gland to a housing in which the shaft seal is created by stacking a plurality of V-pack members, said tapered gland further comprising an end proximal to the packing pusher having a larger diameter interior circular opening than an end distal to the packing pusher such that each V-pack member of the plurality of V-pack members can be sequentially arranged about the shaft onto which the tapered packing gland can be temporarily fixed and can be pushed through the tapered gland to be seated within a gland in the housing to create the shaft seal;
    wherein said packing pusher further comprises an adjustable hinged packing pusher having a hinge which allows it to be fitted over a shaft and locked together via a locking pin that slips into a pair of offset mating holes, the adjustable packing pusher further comprising a plurality of fingers, each finger being spring-loaded via a garter spring and having an end which attaches in a track via a respective pin opening and being secured via a roll pin such that each of the fingers move equally to fit around shafts having different diameters.

2. A packing assembly comprising:
    a split packing pusher comprising a proximal end formed in the shape of a toroid and a distal end formed in the shape of cylinder such that the proximal end is capable of being gripped by a user during use, and said packing pusher having a hinge arranged along one side of the split packing pusher, said split packing pusher further comprising a pair of offset openings arranged on a side of the split packing pusher opposite the hinge and further comprising a pin that is removably arranged within the offset openings to couple the split packing pusher about the shaft, said split packing pusher further comprises a plurality of fingers, each finger being spring-loaded via a garter spring and having an end which attaches in a track via a respective pin opening and being secured via a roll pin such that each of the fingers move equally to fit around shafts having different diameters; and,
    a tapered packing gland having openings which receive threaded studs to secure the tapered gland to a housing in which a shaft seal is created by stacking a plurality of V-pack members, said tapered gland further comprising an end proximal to the packing pusher which comprises a larger diameter interior circular opening than an end distal to the packing pusher such that each V-pack member of the plurality of V-pack members can be sequentially arranged about the shaft onto which the tapered packing gland can be temporarily fixed and can be pushed through the tapered gland to be seated within a gland in the housing to create the shaft seal.

3. The packing assembly of claim 2 wherein said tapered packing gland is a split taper gland and includes a plurality of dowels and associated openings which couple the split taper gland together.

4. A packing assembly comprising:
a split packing pusher having a hinge arranged along one side thereof and further comprising a pair of offset openings arranged on a side of the split packing pusher opposite the hinge, a pin removably arranged within the offset openings to couple the split packing pusher about a shaft, said split packing pusher further comprising a plurality of fingers, each finger being spring-loaded via a garter spring and having an end that attaches in a track via a respective pin opening and being secured via a roll pin such that each of the fingers move equally to fit around shafts having different diameters; and,
a tapered packing gland having openings which receive threaded studs to secure the tapered gland to a housing into which a shaft seal is created.

\* \* \* \* \*